(12) United States Patent
Nogawa et al.

(10) Patent No.: US 7,563,510 B2
(45) Date of Patent: Jul. 21, 2009

(54) FLUID MACHINERY (75) Inventors: Tomoko Nogawa, Sakai (JP); Keiji Yoshimura, Sakai (JP); Tomihiko Yanagiguchi, Settsu (JP); Takeyoshi Okawa, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 139 days.

(21) Appl. No.: 10/557,888

(22) PCT Filed: Jan. 12, 2005

(86) PCT No.: PCT/JP2005/000225

§ 371 (c)(1),
(2), (4) Date: Nov. 18, 2005

(87) PCT Pub. No.: WO2005/068840

PCT Pub. Date: Jul. 28, 2005

(65) Prior Publication Data

US 2007/0031275 A1    Feb. 8, 2007

(30) Foreign Application Priority Data

Jan. 15, 2004    (JP) .............. 2004-008090

(51) Int. Cl.
*B32B 27/00* (2006.01)
*B32B 27/06* (2006.01)
*B32B 27/34* (2006.01)

(52) U.S. Cl. ............. 428/421; 428/473.5; 428/474.4; 418/55.1; 418/55.2

(58) Field of Classification Search .................. None
See application file for complete search history.

(56) References Cited

U.S. PATENT DOCUMENTS

| 4,143,204 A * | 3/1979 | Fang | .......... 428/413 |
|---|---|---|---|
| 4,824,344 A | 4/1989 | Kimura et al. | |
| 6,357,340 B1 | 3/2002 | Kato et al. | |
| 6,769,267 B2 | 8/2004 | Ebara et al. | |
| 6,881,046 B2 * | 4/2005 | Shibamoto et al. | ......... 418/55.2 |

FOREIGN PATENT DOCUMENTS

| CN | 1119704 A | 4/1996 |
|---|---|---|
| CN | 2540525 Y | 3/2003 |
| JP | 59-201992 A | 11/1984 |
| JP | 61-197794 A | 9/1986 |
| JP | 63-253189 A | 10/1988 |
| JP | 01-290993 A | 11/1989 |
| JP | 0697522 A1 | 2/1996 |
| JP | 08-074755 A | 3/1996 |
| JP | 09-088851 | 3/1997 |
| JP | 09-122578 A | 5/1997 |
| JP | 2000-249063 A | 9/2000 |
| JP | 2002-5063 A | 1/2002 |
| JP | 3364016 B2 | 10/2002 |
| JP | 2003-306604 A | 10/2003 |
| KR | 2002-0084265 A | 11/2002 |

* cited by examiner

*Primary Examiner*—Sheeba Ahmed
(74) *Attorney, Agent, or Firm*—Global IP Counselors (57) ABSTRACT

In a scroll compressor, a thrust ring is mounted between a movable-side flat plate part of a movable scroll and a housing. An upper surface of the thrust ring slides relative to a lower surface of the movable-side flat plate part and supports a thrust load from the movable scroll. A resinous coating is formed on the upper surface of the thrust ring which slides relative to the movable-side flat plate part. The resinous coating is composed primarily of fluorocarbon resin and polyamide-imide resin. The component percentage of the polyamide-imide resin in the primary component of the resinous coating is set, such that it is not less than 65% by mass nor more than 85% by mass.

10 Claims, 7 Drawing Sheets

FLUID MACHINERY

CROSS-REFERENCE TO RELATED APPLICATIONS

This U.S. national stage application claims priority under 35 U.S.C. §119(a) to Japanese Patent Application Nos. 2004-008090, filed in Japan on Jan. 15, 2004, the entire content of which is hereby incorporated by reference.

FIELD OF THE INVENTION

This invention relates to measures to improve the reliability of fluid machinery.

BACKGROUND ART

Fluorocarbon resins, such as PTFE (polytetrafluoroethylene, ethylene tetrafluoride resin), are materials conventionally known as having extremely low coefficients of friction. For example, fluorocarbon resins are employed in various machinery for the purpose of slide-resistance reduction, lubrication-state improvement and so on.

For example, Japanese Publication No. 3364016 discloses a scroll compressor which is one type of fluid machinery in which a PTFE based coating is formed on a thrust bearing of a movable scroll. More specifically, in this scroll compressor, a thrust radial bearing shaped like a thin plate is placed on a thrust abutment of a closed housing. A slide surface of the thrust radial bearing that slides relative to the movable scroll is coated with a PTFE based solid lubricant. That is, even when the supply of lubricating oil to the thrust radial bearing is temporarily discontinued, lubrication is provided to the thrust radial bearing and to the movable scroll by the solid lubricant coating with a view to avoiding trouble such as seizure etc.

In addition, Japanese Publication No. 61-197794 discloses a gas force feed pump formed by a scroll fluid machine in which the surface of stationary and movable scrolls is coated with a synthetic resin. More specifically, in the gas force feed pump, the synthetic resin, with which the surface of the stationary and movable scrolls is coated, consists mainly of PTFE and polyimide resin. And, in the gas force feed pump, lubrication is provided by only the coating without the use of lubricating oil. In addition, in the gas force feed pump, the synthetic resin coating is served also as a protective layer for protecting the stationary scroll and other components during the force-feeding of corrosive gases.

DISCLOSURE OF INVENTION

Problems that Invention Intends to Solve

It is required that fluid machinery withstands long hours of operation without maintenance. Particularly, some type of fluid machine having a structure incapable of being disassembled such as a hermetic compressor should be designed so as to fulfill its life without the replacement of component parts. Consequently, in the case where a fluorocarbon-resin containing coating is formed on a slide surface of a constructional member, the coating is required to stay adhered to the slide surface, for example, for tens of thousands of hours without peeling-off.

On the other hand, it is impossible to form such a coating from only fluorocarbon resin such as PTFE. Consequently, it is a general practice that the coating is formed of a mixture of fluorocarbon resin and another resin. In view of forming coatings free from peeling-off over a long period of time, it becomes important which material is used as a resin that is combined with fluorocarbon resin.

In regard to this, Japanese Publication No. 3364016 makes only a disclosure that the solid lubricant is a PTFE based substance, in other words it makes no reference to the material that is combined with PTFE. Consequently, it is unknown which kind of material is to be combined with PTFE for forming, on a slide surface, a coating capable of withstanding practical applications, and it is difficult to improve the reliability of fluid machinery by applying a coating onto a slide surface.

On the other hand, Japanese Publication No. 61-197794 discloses the formation of a coating on the surface of a component member by the use of a mixture of PTFE and polyimide resin. Generally, it is known that polyimide resin not only exhibits excellent heat resistance but also has high hardness. Accordingly, the use of polyimide resins makes it possible to form coatings of high heat resistance and high hardness. Although polyimide resins have high degrees of hardness, the problem with polyimide resins is their poor impact resistance. Therefore, coatings formed of polyimide resins tend to crack or peel off by impact. For this reason, it is still difficult to obtain coatings capable of withstanding practical applications even when employing combinations of PTFE and polyimide resin, and the reliability of fluid machinery is not improved to satisfactory levels.

With the above-described problems with the prior art techniques in mind, the present invention was made. Accordingly, an object of the present invention is to improve the reliability of fluid machinery by forming, on a slide surface, a coating free from cracking and peeling-off over a long period of time.

Means for Solving Problems

A first aspect of the present invention is disclosed which is directed to a fluid machine with a resinous coating (100) formed on one or both of slide surfaces of component members of the fluid machine. The resinous coating (100) is composed primarily of a fluorocarbon resin and a polyamide-imide resin.

A second aspect of the present invention according to the first aspect of the present invention is disclosed in which the component percentage of the polyamide-imide resin in the primary component of the resinous coating (100) is not less than 65% by mass nor more than 85% by mass.

A third aspect of the present invention according to either the first or second aspect of the present invention is disclosed in which the fluid machine is a scroll fluid machine provided with a stationary scroll (55) and a movable scroll (50) in which a stationary-side wrap (58) of the stationary scroll (55) and a movable-side wrap (52) of the movable scroll (50) are engaged with each other; the fluid machine has a supporting member (46) for supporting a thrust load from the movable scroll (50); and the resinous coating (100) is formed on one or both of slide surfaces of the movable scroll (50) and the supporting member (46).

A fourth aspect of the present invention according to the third aspect of the present invention is disclosed in which the movable-side wrap (52) is formed, in a standing manner, on a front surface of a flat plate part (51) in the movable scroll (50); the supporting member (46) slides relative to a back surface of the flat plate part (51) of the movable scroll (50); and the resinous coating (100) is formed on a slide surface of the supporting member (46) relative to the movable scroll (50).

A fifth aspect of the present invention according to the fourth aspect of the present invention is disclosed in which the fluid machine is provided with a thrust ring (46) as a supporting member which is formed by a ring-like metal plate.

A sixth aspect of the present invention according to either the first or second aspect of the present invention is disclosed in which the fluid machine is a rotary fluid machine which comprises a cylinder (81), side plates (86, 88) for closing both ends of the cylinder (81), and a tubular piston (83) which makes eccentric movement within the cylinder (81); and the resinous coating (100) is formed on either one of an end surface of the piston (83) and a surface of the side plates (86, 88) which are in sliding contact with each other or on both.

Operation

In the fluid machine of the first aspect of the present invention, a resinous coating (100) is formed on one or both of slide surfaces of component members of the fluid machine. This resinous coating (100) is composed primarily of a fluorocarbon resin and a polyamide-imide resin. Polyamide-imide resin exhibits a high degree of hardness and excellent impact resistance. For example, in comparison with polyimide resin, polyamide-imide resin offers equal hardness, but it is superior in impact resistance. And, by the combining of polyamide-imide resin and fluorocarbon resin, the resinous coating (100) which exhibits high impact resistance and which does not peel off easily is formed on the slide surfaces of the component members of the fluid machine.

In the second aspect of the present invention, the component percentage of the polyamide-imide resin in the primary component of the resinous coating (100) is set, such that it is not less than 65% by mass nor more than 85% by mass. Stated another way, if the mass of the primary component of the resinous coating (100) is a number of 100, then the mass of the polyamide-imide resin is not less than 65 nor more than 85 while, on the other hand, the mass of the fluorocarbon resin is not less than 15 nor more than 35.

For the case of fluid machinery, generally lubrication of slide surfaces is provided by lubricating oil. And, the general purpose of forming the fluorocarbon resin-containing resinous coating (100) on slide surfaces of component members is to maintain the component members in a good lubrication state even when a supply of lubricating oil is interrupted temporarily. In other words, the resinous coating (100) is required to be able to maintain a good lubrication state even when a supply of lubricating oil is interrupted. In addition, the resinous coating (100) is further required to undergo less degrees of abrasion both in the state in which there is provided a supply of lubricating oil (lubrication state) and in the state in which there is provided no supply of lubricating oil (non lubrication state).

In order to meet these requirements, in the second embodiment, the component percentage of polyamide-imide resin in the primary component of the resinous coating (100) is not less than 65% by mass nor more than 85% by mass. This point is described. As the rate of polyamide-imide resin in the resinous coating (100) decreases, the hardness of the resinous coating (100) likewise decreases. If the hardness of the resinous coating (100) decreases, this causes the amount of abrasion of the resinous coating (100) in the lubrication state to increase. Because of this, the rate of polyamide-imide resin in the resinous coating (100) is required to be above a certain value. On the other hand, it is the fluorocarbon resin that mainly plays the role of reducing friction between component members in the non lubrication state. Because of this, what is required to maintain inter-member lubrication in an excellent state in the non lubrication state is that more than a certain amount of fluorocarbon resin is contained in the resinous coating (100). In other words, it is required that the rate of polyamide-imide resin in the resinous coating (100) be set to values falling below a certain level. To this end, in the present invention, the component percentage of polyamide-imide resin in the primary component of the resinous coating (100) is set, such that it falls within the above-mentioned numerical range.

In the third aspect of the present invention, the resinous coating (100) is formed in a scroll fluid machine. In the scroll fluid machine, a thrust load (axial load) acts on the movable scroll (50) by gas pressure or the like, and the thrust load from the movable scroll (50) is supported by the supporting member (46). And, the resinous coating (100) is formed on one or both of a slide surface of the supporting member (46) that receives a thrust load and a slide surface of the movable scroll (50) that slides relative to the slide surface of the supporting member (46).

In the fourth aspect of the present invention, the slide surface of the supporting member (46) is coated with the resinous coating (100). The slide surface of the supporting member (46) on which is formed the resinous coating (100) slides relative to the back surface of the flat plate part (51) in the movable scroll (50), i.e., the opposite surface to the movable-side wrap (52).

In the fifth aspect of the present invention, the thrust ring (46) serves as a supporting member. The thrust ring (46) is formed from a metal plate shaped like a ring, and slides relative to the movable scroll (50). And, the resinous coating (100) is formed on the slide surface of the thrust ring (46) relative to the movable scroll (50).

In the sixth aspect of the present invention, the resinous coating (100) is formed in a rotary fluid machine. In the rotary fluid machine, the tubular piston (83) makes eccentric movement within the cylinder (81) whose both ends are closed by the side plates (86, 88). At that time, the end surfaces of the piston (83) and the surfaces of the side plates (86, 88) slide against each other. And, the resinous coating (100) is formed on either one of an end surface of the piston (83) and a surface of the side plates (86, 88) which slide against each other or on both.

The present invention employs polyamide-imide resin as a resin that forms the resinous coating (100), together with fluorocarbon resin. And, by making utilization of the characteristics of polyamide-imide resin, i.e., excellent impact resistance, it becomes possible to form, on the slide surfaces of the component members of the fluid machine, the resinous coating (100) which exhibits high impact resistance and which does not peel off easily. In addition, polyamide-imide resin also has a property of high hardness, which means that the resinous coating (100) offers a relatively high degree of hardness and resistance to abrasion. Accordingly, in accordance with the present invention, it becomes possible to form, on the slide surfaces, the resinous coating (100) free from cracking and peeling-off over a long period of time, and it is ensured that the reliability of fluid machinery is improved without fail.

Particularly, in the second aspect of the present invention, the component percentage of polyamide-imide resin in the primary component of the resinous coating (100) is so set as to fall within a predetermined numerical range. As a result of such a setting, it becomes possible to provide not only excellent lubrication states but also formation of the resinous coating (100) with a less amount of abrasion both in a state in which a supply of lubricating oil is provided to the slide surfaces (lubrication state) and in a state in which no supply of lubricating oil is provided to the slide surfaces (non lubrication state). Accordingly, in accordance with the present invention, it becomes possible to realize the resinous coating (100)

best suited for fluid machinery which may be placed in both the lubrication state and the non lubrication state, thereby further improving the reliability of such fluid machinery without failing.

In each of the third to fifth aspects of the present inventions, the resinous coating (100) is formed on the slide surface of the movable scroll (50) as well as on the slide surface of the supporting member (46). In the scroll fluid machine, the supporting member (46) receives relatively great loads from the movable scroll (50). As a result, the slide surfaces of the movable scroll (50) and the supporting member (46) receive relatively great contact pressures, and tend to fall into a severe lubrication state. To cope with this, in the present invention, the resinous coating (100) is applied onto slide surfaces on which great contact pressures act to cause severe lubrication states. Accordingly, in accordance with these aspects of the present inventions, it is possible to improve the lubrication state of the slide surfaces of the movable scroll (50) and the supporting member (46) by the resinous coating (100), thereby improving the reliability of scroll fluid machinery.

Further, during the operation of the scroll fluid machine, the magnitude of thrust load which acts on the supporting member (46) from the movable scroll (50) varies. Because of this, if a resinous coating exhibits poor impact resistance, this may cause the resinous coating to undergo peeling-off or cracking due to the variation in thrust load. On the other hand, in the third to fifth aspect of the present inventions, the resinous coating (100), which is composed mainly of fluorocarbon resin and polyamide-imide resin and which is therefore superior in impact resistance, is formed on the slide surface of the movable scroll (50) as well as on the slide surface of the supporting member (46). Accordingly, in accordance with these aspects of the present inventions, it becomes possible to prevent the occurrence of cracking or peeling-off to the resinous coating (100) formed on the slide surface of the movable scroll (50) and on the slide surface of the supporting member (46). This also makes it possible to improve the reliability of scroll fluid machinery.

Particularly, in the fifth aspect of the present invention, the thrust ring (46) constitutes a supporting member and the resinous coating (100) is formed on the thrust ring (46). In other words, in this invention, the resinous coating (100) is formed on the thrust ring (46) which is relatively light and easy to handle. Accordingly, this aspect of the present invention facilitates the work of forming the resinous coating (100), thereby inhibiting the rise in production costs of the scroll fluid machine due to the formation of the resinous coating (100).

Finally, in the sixth aspect of the present invention, it is arranged that the resinous coating (100) is formed on either one of a slide surface of the piston (83) and a slide surface of the side plates (86, 88) or on both. In a typical rotary compressor, certain gaps are taken between the piston (83) and the side plates (86, 88) for the purpose of preventing the occurrence of seizure. As the result of this, an inflow of fluid into the cylinder (81) may leak from the gaps between the piston (83) and the side plates (86, 88). This arises the problem of efficiency lowering. On the other hand, in this aspect of the present invention, the resinous coating (100) is applied onto the slide surfaces of the piston (83) and the side plates (86, 88). As a result of such application, even when there is taken little clearance between the piston (83) and the side plates (86, 88), it is possible to avoid seizure between the piston (83) and the side plates (86, 88) by the resinous coating (100). Accordingly, this aspect of the present invention makes it possible to improve the reliability of the rotary fluid machine by preventing the occurrence of seizure between the piston (83) and the side plates (86, 88) while, simultaneously, improving the efficiency of the rotary fluid machine by narrowing the clearance between the piston (83) and the side plates (86, 88) so as to reduce the amount of leakage of the fluid.

BEST MODE FOR CARRYING OUT INVENTION

Hereinafter, embodiments of the present invention are described in detail with reference to the drawings.

Embodiment 1

A first embodiment of the present invention is described. A scroll compressor (10) of the present embodiment is a scroll fluid machine. The scroll compressor (10) is disposed in a refrigerant circuit of a refrigeration apparatus and is operated to compress gas refrigerant. As the refrigerant subjected to compression by the scroll compressor (10), HFC refrigerants such as R410A may be used.

Figure 1:
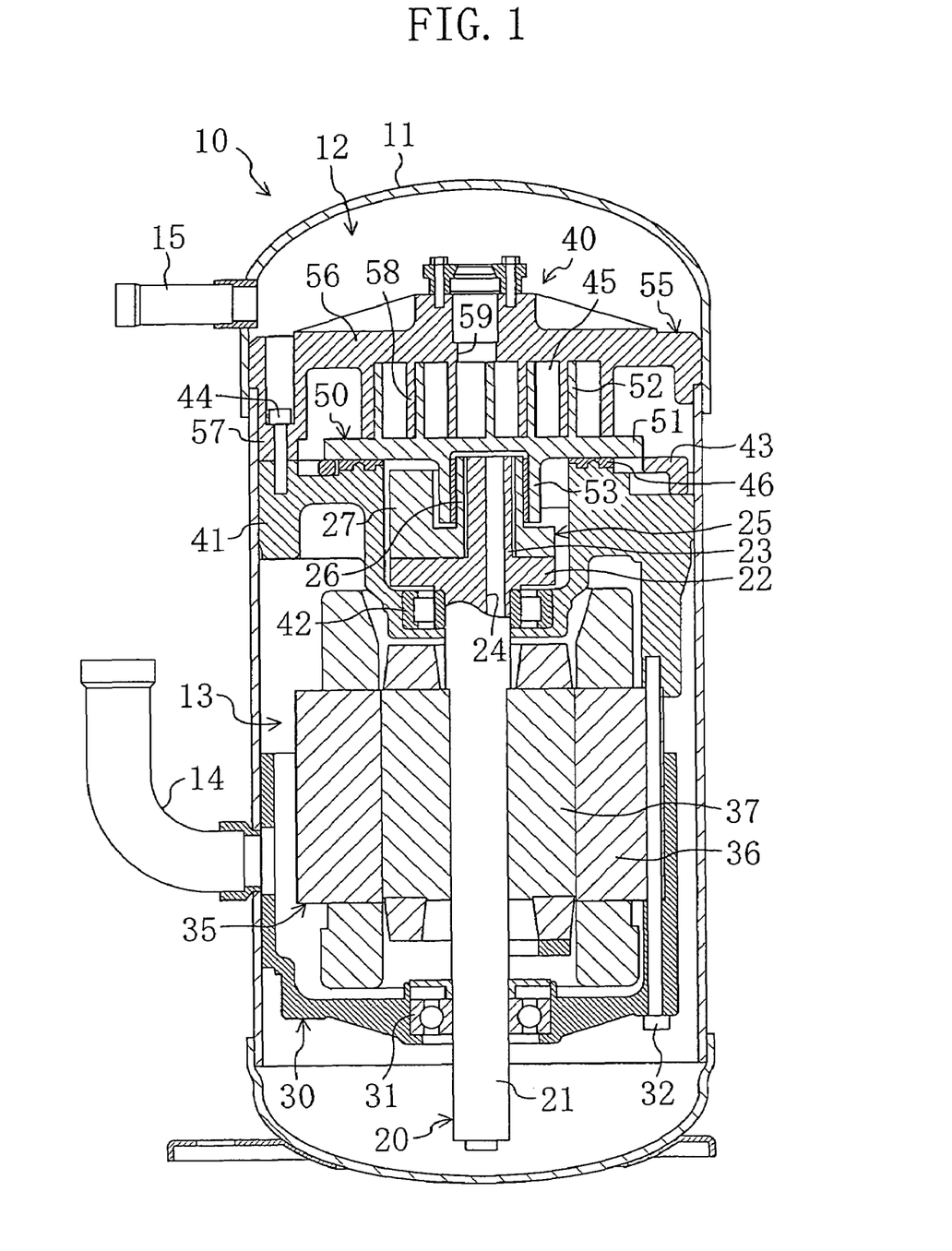
FIG. 1 is a cross sectional view showing an entire arrangement of a scroll compressor according to a first embodiment.

As shown in FIG. 1, the scroll compressor (10) is formed into a hermetic compressor. The scroll compressor (10) has a casing (11) which is formed into a longitudinally oblong, tubular, hermetically sealed container. In the inside of the casing (11), a lower bearing member (30), an electric motor (35), and a compression mechanism (40) are arranged in that order in the bottom-to-top direction. In addition, a drive shaft (20) is mounted in the casing (11), such that it extends vertically in the casing (11).

The interior space of the casing (11) is divided in an upper space and a lower space by a stationary scroll (55) of the compression mechanism (40). In the inside of the casing (11), the upper space overlying the stationary scroll (55) becomes a first chamber (12) while, on the other hand, the lower space underlying the stationary scroll (55) becomes a second chamber (13).

A suction pipe (14) is attached to a body part of the casing (11). The suction pipe (14) opens into the second chamber (13) of the casing (11). On the other hand, a discharge pipe (15) is attached to an upper end part of the casing (11). The discharge pipe (15) opens into the first chamber (12) of the casing (11). In addition, the casing (11) is provided with a terminal for electrical supply (not shown). The electric motor (35) of the casing (11) is supplied with electrical power through the terminal.

The drive shaft (20) has a main shaft part (21), a rib part (22), and an eccentric part (23). The rib part (22) is formed at an upper end of the main shaft part (21) and is shaped like a circular plate with a greater diameter than that of the main shaft part (21). On the other hand, the eccentric part (23) is provided, in a projecting manner, at an upper surface of the rib part (22). The eccentric part (23) is shaped like a cylinder with a smaller diameter than that of the main shaft part (21) and its center of axle is off-centered against the center of axle of the main shaft part (21). The main shaft part (21) of the drive shaft (20) passes completely through a housing (41) of the compression mechanism (40). The main shaft part (21) is supported on the housing (41) through a roller bearing (42).

A lubrication passage (24) is formed, such that it extends vertically in the inside of the drive shaft (20). In addition, the main shaft part (21) has, at its lower end part, a lubrication pump (not shown). The lubrication pump (33) draws in refrigeration oil accumulated at the bottom of the casing (11) and delivers it to the lubrication passage (24). The refrigeration oil flows through the lubrication passage (24), and is supplied to the compression mechanism (40) and so on.

A slide bush (25) is attached to the drive shaft (20). The slide bush (25) has a tubular part (26) and a balance weight part (27) and is placed on the rib part (22). The eccentric part (23) of the drive shaft (20) is rotatably inserted into the tubular part (26) of the slide bush (25).

The lower bearing member (30) is positioned in the second chamber (13) of the casing (11). The lower bearing member (30) is firmly fixed to the housing (41) by a bolt (32). And, the lower bearing member (30) supports the main shaft part (21) of the drive shaft (20) through the roller bearing (31).

The electric motor (35) is made up of a stator (36) and a rotor (37). The stator (36) is, together with the lower bearing member (30), firmly fixed to the housing (41) by the bolt (32). On the other hand, the rotor (37) is firmly fixed to the main shaft part (21) of the drive shaft (20).

In addition to the stationary scroll (55) and the housing (41), the compression mechanism (40) further includes a movable scroll (50), an Oldham ring (43), and a thrust ring (46). In the compression mechanism (40), a compression chamber (45) is formed by engagement between a stationary-side wrap (58) of the stationary scroll (55) and a movable-side wrap (52) of the movable scroll (50).

In addition to the stationary-side wrap (58), the stationary scroll (55) further includes a stationary-side flat plate part (56) and an edge part (57).

The stationary-side flat plate part (56) is shaped like a somewhat thick circular plate. The diameter of the stationary-side flat plate part (56) is approximately equal to the inside diameter of the casing (11). A discharge opening (67) is formed centrally in the stationary-side flat plate part (56). The discharge opening (67) extends, passing completely through the stationary-side flat plate part (56) and establishes communication between the compression chamber (45) and the first chamber (12). On the other hand, the edge part (57) is formed into a wall-like shape extending downwards from a peripheral portion of the stationary-side flat plate part (56). A lower end of the edge part (57) is in abutment with the housing (41).

The stationary scroll (55) is firmly fixed to the housing (41) by a bolt (44). The edge part (57) of the stationary scroll (55) is in close contact with the casing (11), whereby the interior of the casing (11) is divided into the first chamber (12) and the second chamber (13).

The stationary-side wrap (58) is mounted, in a standing manner, on the side of a lower surface of the stationary-side flat plate part (56), such that it is formed integrally with the stationary-side flat plate part (56). The stationary-side wrap (58) is formed into a spiral wall-like shape of a constant height. A side surface of the stationary-side wrap (58) becomes an enveloping surface of the movable-side wrap (52) (described later).

The movable scroll (50) has, in addition to the movable-side wrap (52), a movable-side flat plate part (51) and a projecting part (53).

The movable-side flat plate part (51) is shaped like a somewhat thick circular plate. The projecting part (53) is formed into a tubular shape and is formed, in a projecting manner, approximately centrally on a lower surface of the movable-side flat plate part (51). The tubular part (26) of the slide bush (25) is inserted into the projecting part (53). Stated another way, the movable scroll (50) is brought into engagement with the eccentric part (23) of the drive shaft (20) through the slide bush (25).

The movable-side wrap (52) is formed, in a standing manner, on the side of an upper surface of the movable-side flat plate part (51), such that it is formed integrally with the movable-side flat plate part (51). As shown in FIG. 1, the movable-side wrap (52) is formed into a spiral wall-like shape of a constant height. The movable-side wrap (52) is a spiral shape making an involute curve, when viewed from its leading end side.

The movable scroll (50) is placed on the housing (41) through the Oldham ring (43) and the thrust ring (46).

First and second pairs of keys are formed in the Oldham ring (43). The first pair of keys engage the movable-side flat plate part (51) of the movable scroll (50) while, on the other hand, the second pair of keys engage the housing (41), whereby the rotation of the movable scroll (50) on its axis is regulated by the Oldham ring (43).

Figure 2:
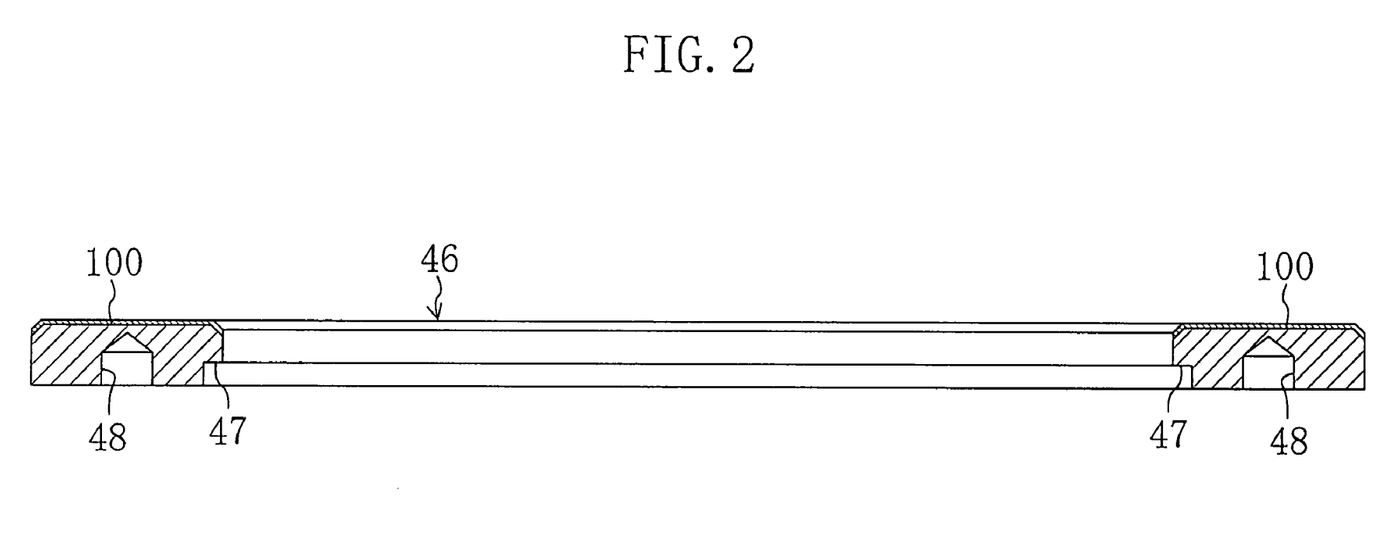
FIG. 2 is a cross sectional view of a thrust ring.

As shown in FIG. 2, the thrust ring (46) is shaped like a ring with flat upper and lower surfaces. The outside diameter of the thrust ring (46) is smaller than the inside diameter of the Oldham ring (43). The thrust ring (46) constitutes a supporting member for supporting thrust loads from the movable scroll (50). As the material to form the thrust ring (46), materials selected from the iron family (carbon steel, cast iron etc.), non-ferrous metals (aluminum), and sintered metals may be used.

The thrust ring (46) has a stepped part (47) formed by recessing an inner circumference side area of a lower surface of the thrust ring (46) for one step and a plurality of engagement holes (48) which open at the lower surface. The upper surface of the thrust ring (46) is chamfered at its outer and inner circumferential sides. In addition, a resinous coating (100) is formed on the upper surface of the thrust ring (46). The resinous coating (100) will be described later.

The thrust ring (46) is mounted on the upper surface of the housing (41) (see FIG. 1). In this state, projection parts projectingly formed on the upper surface of the housing (41) are engaged into the stepped portion (47) and the engagement holes (48) of the thrust ring (46). The thrust ring (46) is disposed, such that it is sandwiched between the movable-side flat plate part (51) of the movable scroll (50) and the housing (41). The upper surface of the thrust ring (46) on which the resinous coating (100) is formed serves as a slide surface for sliding relative to the lower surface (i.e., back surface) of the movable-side flat plate part (51).

The resinous coating (100) consists mainly of fluorocarbon resin and polyamide-imide resin. The resinous coating (100) is formed on the thrust ring (46) in the following way. That is, the resinous coating (100) is formed by: an application step of applying a resin material onto the upper surface of the thrust ring (46); a burning step of heating the thrust ring (46) coated with the resin material up to a temperature of about 280 degrees Centigrade; and a polishing step of polishing the surface of the coating with a lap.

The primary component of the resinous coating (100) is made up of fluorocarbon resin of not less than 15% by mass nor more than 35% by mass and polyamide-imide resin of not less than 65% by mass nor more than 85%. In addition, the fluorocarbon resin in the primary component is made up of FEP (tetrafluoroethylene-hexafluoropropylene copolymer resin, ethylene fluoride propylene resin) and PTFE (polytetrafluoroethylene). In this fluorocarbon resin, the ratio of FEP is greater than that of PTFE. More specifically, preferably the mass ratio of FEP and PTFE is 9:1.

In addition to the primary component made up of fluorocarbon resin and polyamide-imide resin, the resinous coating (100) is combined with a pigment as an artificial color such as carbon and other additive agents. The addition amounts of these additive agents are set to such degrees that the performance of the resinous coating (100) and the degree of contact with the thrust ring (46) are not ill-effected. For example, it is required that carbon as an additive agent be set so as to fall below 3% by mass of the fluorocarbon resin, preferably not more than 1% by mass (more preferably not more than 0.5% by mass).

Running Operation

As described above, the scroll compressor (10) of the present embodiment is installed in a refrigerant circuit of a refrigeration apparatus. And, the scroll compressor (10) draws in low-pressure gas refrigerant from an evaporator and compresses it. Then, the post-compression, high-pressure gas refrigerant is delivered to a condenser. Here, the operation of compressing a refrigerant by the scroll compressor (10) is described.

Rotational power generated in the electric motor (35) is transmitted by the drive shaft (20) to the movable scroll (50). The movable scroll (50) driven by the drive shaft (20) is guided by the Oldham ring (43), wherein the movable scroll (50) makes only orbital motion without rotating on its axis.

Low-pressure gas refrigerant drawn into the scroll compressor (10) flows into the second chamber (13) of the casing (11) by way of the suction pipe (14). This gas refrigerant is drawn into the compression chamber (45) from the outer peripheral side of the movable-side wrap (52) and from the outer peripheral side of the stationary-side wrap (58). As the movable scroll (50) makes orbital motion, the volume of the compression chamber (45) which enters the closed state decreases accordingly, and the gas refrigerant in the compressor chamber (45) is compressed. And, the gas refrigerant compressed to high pressure flows into the first chamber (12) through the discharge opening (67) and, thereafter, is discharged out of the scroll compressor (10) through the discharge pipe (15).

As described above, in the compression mechanism (40), the refrigerant in the compression chamber (45) is compressed, and the pressure of gas in the compression chamber (45) increases accordingly. Because of this, a load in the direction of pulling the movable scroll (50) away from the stationary scroll (55), i.e., a downward thrust load (axial load), acts on the movable scroll (50). The downward thrust load from the movable scroll (50) is supported by the thrust ring (46) which is placed on the housing (41) and which is in sliding contact with the movable scroll (50).

During the operation of the scroll compressor (10), a supply of refrigeration oil is provided to each sliding portion by way of the lubrication passage (24) of the drive shaft (20) and the sliding portions are lubricated by the supplied refrigeration oil, in ordinary circumstances. In other words, the slide surfaces of the movable scroll (50) and the thrust ring (46) are lubricated by refrigeration oil.

On the other hand, there are cases where lubrication by means of refrigeration oil is not provided satisfactorily depending on the operational status. For example, there is such a case that, when the scroll compressor (10) is at rest, the refrigeration oil supplied to sliding portions is washed away by liquid refrigerant entering from the discharge pipe (15). Thereafter, when the scroll compressor (10) is activated, the members will slide against each other in the absence of refrigeration oil until the time there is provided a supply of refrigeration oil to the sliding portions. In addition, since a portion of the refrigeration oil circulates in the refrigerant circuit, together with the refrigerant and there is a possibility that the storage amount of refrigeration oil in the casing (11) becomes too little thereby causing a shortage of the supply amount of refrigeration oil to the sliding portions. Besides, if a relatively large amount of liquid refrigerant enters from the suction pipe (14) and dissolves into refrigeration oil, then the viscosity of refrigeration oil to be supplied to the sliding portions decreases and, as a result, the adequate effect of lubrication may not be obtained. Even in such a case that lubrication by means of refrigeration oil is no longer expected, the lubrication of the slide surfaces of the movable scroll (50) and the thrust ring (46) is provided by the resinous coating (100).

Composition of Resinous Coating

As described above, in the primary component of the resinous coating (100), the component percentage of polyamide-imide resin is not less than 65% by mass nor more than 85% by mass. Here, the reason for setting the component percentage of polyamide-imide resin so that it falls within such a numerical range will be described below.

First of all, characteristics required for the resinous coating (100) are discussed.

A first characteristic required for the resinous coating (100) is that it exhibits an adequately low coefficient of friction. It is reasonable for the resinous coating (100) to be required to have such a property because the resinous coating (100) is provided to maintain lubrication between members in a good state.

A second characteristic required for the resinous coating (100) is that the amount of abrasion is small. If the resinous coating (100) is worn out completely, this means that the effect of lubrication is no longer obtained naturally. Therefore, the amount of abrasion of the resinous coating (100) is required to be at a certain low level. Additionally, if, in the scroll compressor (10), the resinous coating (100) of the thrust ring (46) is worn out, this causes the position of the movable scroll (50) to descend for an amount corresponding to the amount of abrasion of the resinous coating (100). As a result, the clearance between the leading end of the wrap (52, 58) and the flat plate portion (51, 56) expands, thereby causing a drop in efficiency. Accordingly, also in view of this point, it is required that the amount of abrasion of the resinous coating (100) be held to fall below a certain low level.

On the other hand, in the scroll compressor (10), adequate amounts of refrigeration oil are supplied to the sliding portions in ordinary circumstances, as described above; however, there is a possibility that lubrication by refrigeration oil may not be expected depending on circumstances. Accordingly, the resinous coating (100) formed on the members of the scroll compressor (10) is required to have the aforesaid first and second characteristics in the case where there is refrigeration oil as well as in the case where there is no refrigeration oil.

Figure 3:
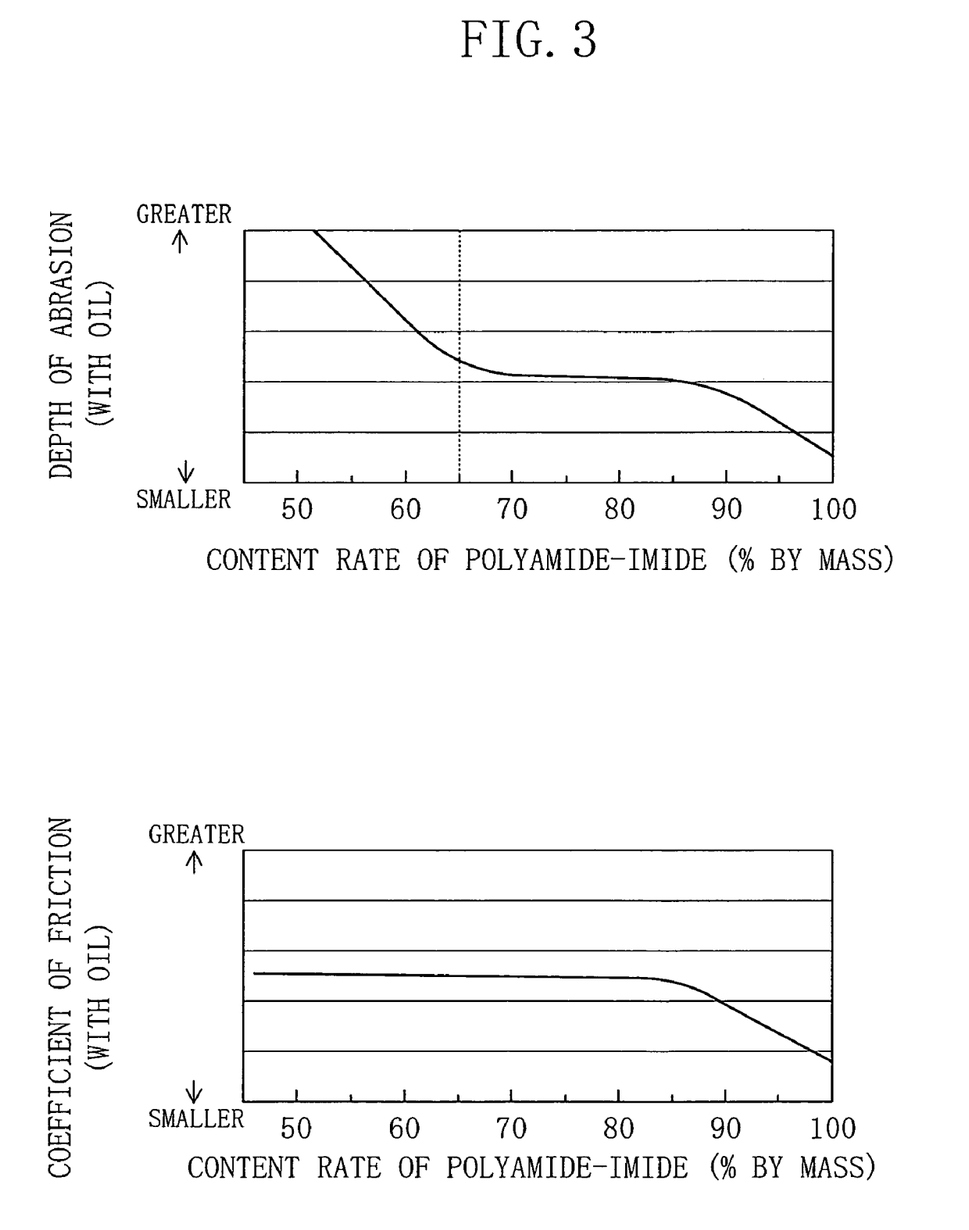
FIG. 3 graphically shows a relationship between the percentage of content of polyamide-imide resin in a resinous coating and the depth of abrasion, and a relationship between the percentage of content of polyamide-imide resin in a resinous coating and the coefficient of friction with the presence of refrigeration oil.
Figure 4:
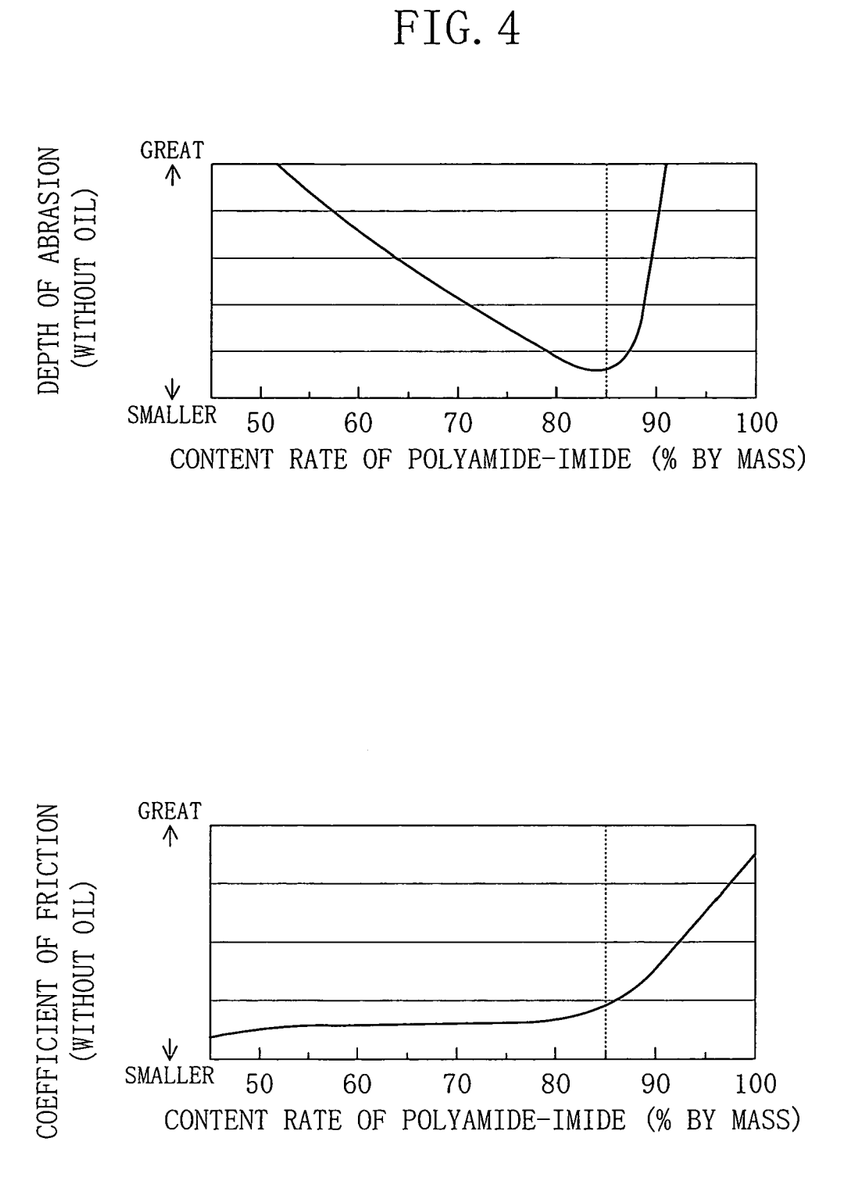
FIG. 4 graphically shows a relationship between the percentage of content of polyamide-imide resin in a resinous coating and the depth of abrasion, and a relationship between the percentage of content of polyamide-imide resin in a resinous coating and the coefficient of friction without the presence of refrigeration oil.

In order to obtain the resinous coating (100) capable of meeting all of the above-described conditions, it suffices if the component percentage of polyamide-imide resin in the primary component of the resinous coating (100) is so set as to be not less than 65% by mass nor more than 85% by mass. This point is described with reference to FIG. 3 and FIG. 4. FIGS. 3 and 4 each graphically show a relationship between the component percentage of polyamide-imide resin in the primary component of the resinous coating (100) and the depth of abrasion of the resinous coating (100), and a relationship between the component percentage of polyamide-imide resin in the primary component of the resinous coating (100) and the coefficient of friction of the resinous coating (100). In addition, FIG. 3 represents data when there is a supply of refrigeration oil on the resinous coating (100) while, on the other hand, FIG. 4 represents data when there is no supply of refrigeration oil on the resinous coating (100).

In the state in which there is a supply of refrigeration oil on the resinous coating (100), lubrication is provided mainly by the refrigeration oil. In this state, as the component percentage (rate of content) of polyamide-imide resin diminishes, the depth of abrasion increases (see FIG. 3). This is because the degree of hardness of the resinous coating (100) decreases as the component percentage of polyamide-imide resin diminishes. In other words, in the state in which there is a supply of refrigeration oil on the resinous coating (100), it is advantageous that the degree of hardness of the resinous coating (100) is high. In addition, if the component percentage of polyamide-imide resin falls below 65% by mass, this causes the depth of abrasion of the resinous coating (100) to increase sharply. Accordingly, preferably the component percentage of polyamide-imide resin in the primary component of the resinous coating (100) is so set as to exceed 65% by mass.

On the other hand, if the component percentage of polyamide-imide resin in the primary component of the resinous coating (100) is set excessively, this produces problems in the state in which there is no refrigeration oil on the resinous coating (100). Stated another way, if the component percentage of polyamide-imide resin increases, this accompanies a decrease in the component percentage of fluorocarbon resin. As a result, the effect of friction reduction by fluorocarbon resin is lessened. More specifically, when the component percentage of polyamide-imide resin exceeds 85% by mass, the coefficient of friction increases sharply and, in addition, the depth of abrasion also increases sharply (see FIG. 4). Accordingly, preferably the component percentage of polyamide-imide resin in the primary component of the resinous coating (100) is so set as to fall below 85% by mass.

The above shows that, if the component percentage of polyamide-imide resin in the primary component of the resinous coating (100) is so set as to be not less than 65% by mass nor more than 85% by mass, this provides the resinous coating (100) whose abrasion depth is sufficiently little and whose friction coefficient is sufficiently low not only in the state in which there exists refrigeration oil on the resinous coating (100) but also in the state in which there exists no refrigeration oil on the resinous coating (100).

Effects of Embodiment 1

In the present embodiment, in combination with fluorocarbon resin, polyamide-imide resin is employed to form the resinous coating (100). And, by making use of a characteristic of polyamide-imide resin, i.e., excellent impact resistance, it becomes possible to form, on the slide surface of the thrust ring (46), the resinous coating (100) which exhibits high impact resistance and which does not peel off easily. In addition, the polyamide-imide resin further has a property of high hardness, so that the resinous coating (100) is relatively hard and is not worn out easily. Accordingly, the present embodiment makes it possible to form, on the slide surface, the resinous coating (100) which is free from cracking or peeling-off over a long period of time, thereby ensuring that the reliability of the scroll compressor (10) is improved without fail.

In addition, in accordance with the present embodiment, the component percentage of polyamide-imide resin in the primary component of the resinous coating (100) is so set as to fall within a predetermined numerical range. Because of such a setting, it is possible to realize the resinous coating (100) which provides an excellent lubrication state and whose abrasion amount is small in the state in which there exists refrigeration oil on the resinous coating (100) as well as in the state in which there exists no refrigeration oil on the resinous coating (100). Accordingly, in accordance with the present embodiment, it becomes possible to realize the resinous coating (100) most suitable for the scroll compressor (10) which may fall into a state in which there is no refrigeration oil on the resinous coating (100), thereby ensuring that the reliability of the scroll compressor (10) is improved to a further extent.

In addition, in the present embodiment, the slide surface of the thrust ring (46) with respect to the movable scroll (50) is coated with the resinous coating (100). In the scroll compressor (10), the thrust ring (46) receives a relatively great thrust load from the movable scroll, and a relatively great contact pressure acts on the slide surface of the thrust ring (46). Particularly, when a mixed refrigerant containing R32, such as R410A, R407C etc, is used as the refrigerant of the refrigerant circuit, the discharge pressure of the scroll compressor (10) becomes relatively high and, as a result, a further greater thrust load acts on the slide surface of the thrust ring (46). On the other hand, in the present embodiment, the resinous coating (100) is applied onto the slide surface of the thrust ring (46) on which a relatively large contact pressure acts. Because of this, it becomes possible to ensure that the slide surface of each of the thrust ring (46) and the movable scroll (50), i.e., those which are placed in severe lubrication conditions due to application of great loads thereon, is lubricated by the resinous coating (100), thereby making it possible to ensure that the reliability of the scroll compressor (10) is improved.

The resinous coating (100) is formed after undergoing the foregoing burning and polishing steps. Consequently, when the resinous coating (100) is formed on a member which is large in size and complicated in shape (e.g., the housing (41), the movable scroll (50) etc.), the member may become deformed due to heat strain in the burning step and the amount of work required for dealing with the member in each step may increase.

On the other hand, the present embodiment employs such a construction that the resinous coating (100) is formed on the thrust ring (46) which is relatively simple in shape and light in weight and the thrust ring (46) is attached to the housing (41) for sliding with the movable scroll (50). And, since the thrust ring (46) is shaped like a ring having a simple structure, the problem of heat strain in the burning step is unlikely to arise. Besides, the thrust ring (46) is relatively small in size and light in weight, so that the thrust ring (46) can be dealt with easily in each step. Accordingly, the present embodiment makes it possible to not only reduce the costs required for forming the resinous coating (100) on the thrust ring (46) but also inhibit the production costs of the scroll compressor (10) resulting from the formation of the resinous coating (100) from increasing.

Modified Example of Embodiment 1

The scroll compressor (10) of the present embodiment may employ such a construction that the housing (41) directly supports a thrust load from the movable scroll (50) without the provision of the thrust ring (46). In this case, the resinous coating (100) is formed on an area of the upper surface of the housing (41) that slides relative to the movable-side flat plate part (51) of the movable scroll (50).

In addition, in the scroll compressor (10) of the present embodiment, the resinous coating (100) is formed on the upper surface of the thrust ring (46). Alternatively, it may be arranged that the resinous coating (100) is formed on an area of the back surface of the movable-side flat plate part (51) of the movable scroll (50) that slides relative to the thrust ring (46). Furthermore, it may be arranged that the resinous coating (100) is formed on both the slide surface of the thrust ring (46) and the slide surface of the movable scroll (50).

Embodiment 2 of Invention

A second embodiment of the present invention is described. The present embodiment is a swinging-type rotary compressor (60) formed by a rotary fluid machine according to the present invention. The rotary compressor (60) is disposed in a refrigerant circuit of a refrigeration apparatus and is used to compress refrigerant.

Figure 5:
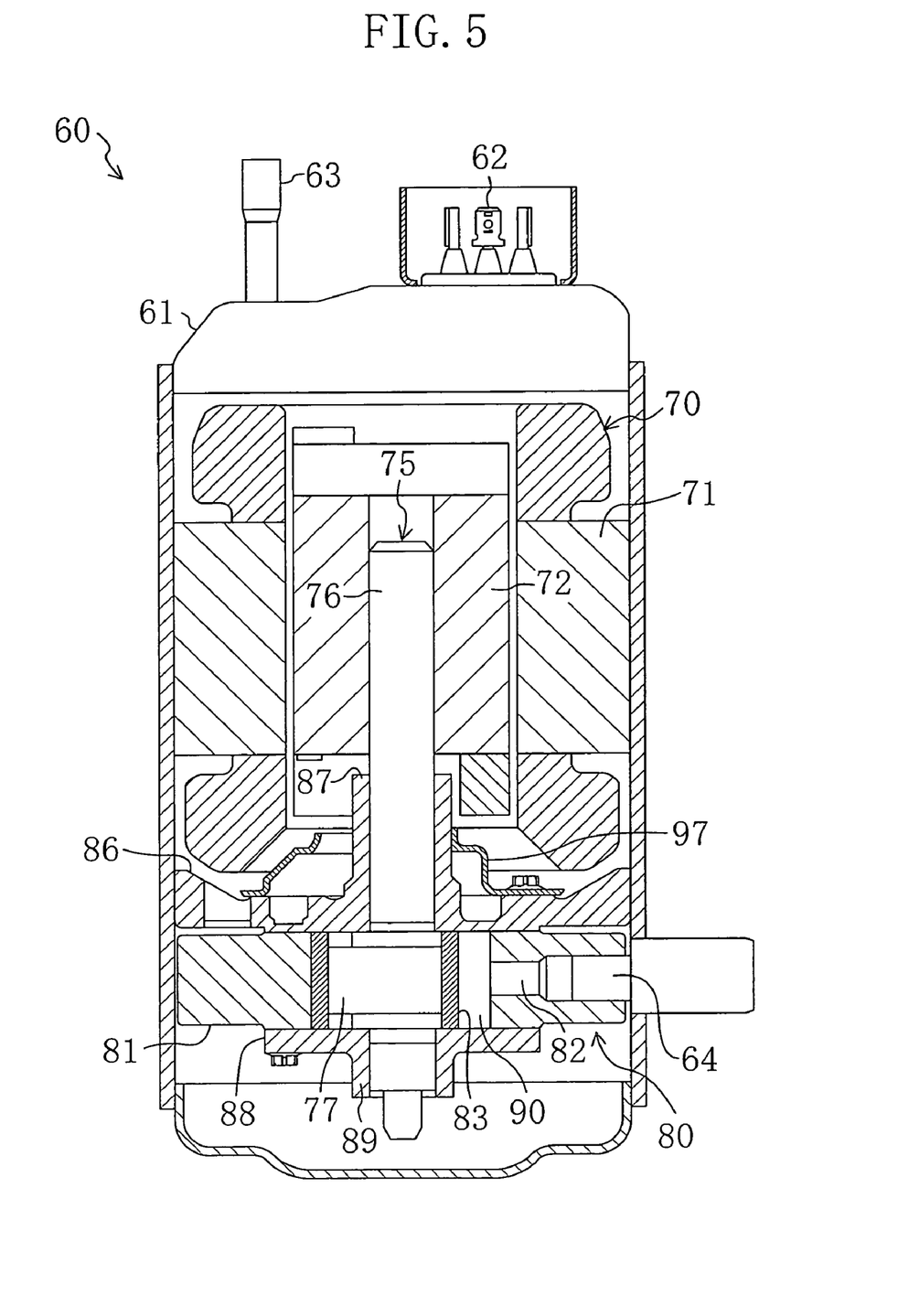
FIG. 5 is a cross sectional view showing an entire arrangement of a rotary compressor according to a second embodiment.

As shown in FIG. 5, the rotary compressor (60) of the present embodiment is formed into a so-called hermetical type. More specifically, the rotary compressor (60) has a casing (61) shaped like a vertically long, tubular, hermetically sealed container. Accommodated in the casing (61) are a compression mechanism (80), a drive shaft (75), and an electric motor (70). In the casing (61), the compression mechanism (80) underlies the electric motor (70).

A terminal (62) and a discharge pipe (63) are attached to the top of the casing (61). The terminal (62) is used to supply the electric motor (70) with electric power. On the other hand, the discharge pipe (63) passes completely through the casing (61) and one end of the discharge pipe (63) opens into a space within the casing (61).

The electric motor (70) has a stator (71) and a rotor (72). The stator (71) is firmly fixed to the body of the casing (61) by shrinkage fitting or other like technique. The stator (71) is electrically connected to a terminal of the terminal (62) through a lead line (not shown), which is not diagrammatically shown. On the other hand, the rotor (72) is firmly fixed to the drive shaft (75).

The drive shaft (75) has a main shaft part (76) and an eccentric part (77), and is mounted in such a position so as to extend vertically. The eccentric part (77) is located at an area nearer to the lower end of the drive shaft (75). The eccentric part (77) is formed, such that it has a greater diameter than the main shaft part (76) and its center of axle is off-centered relative to the center of axle of the main shaft part (76).

Figure 6:
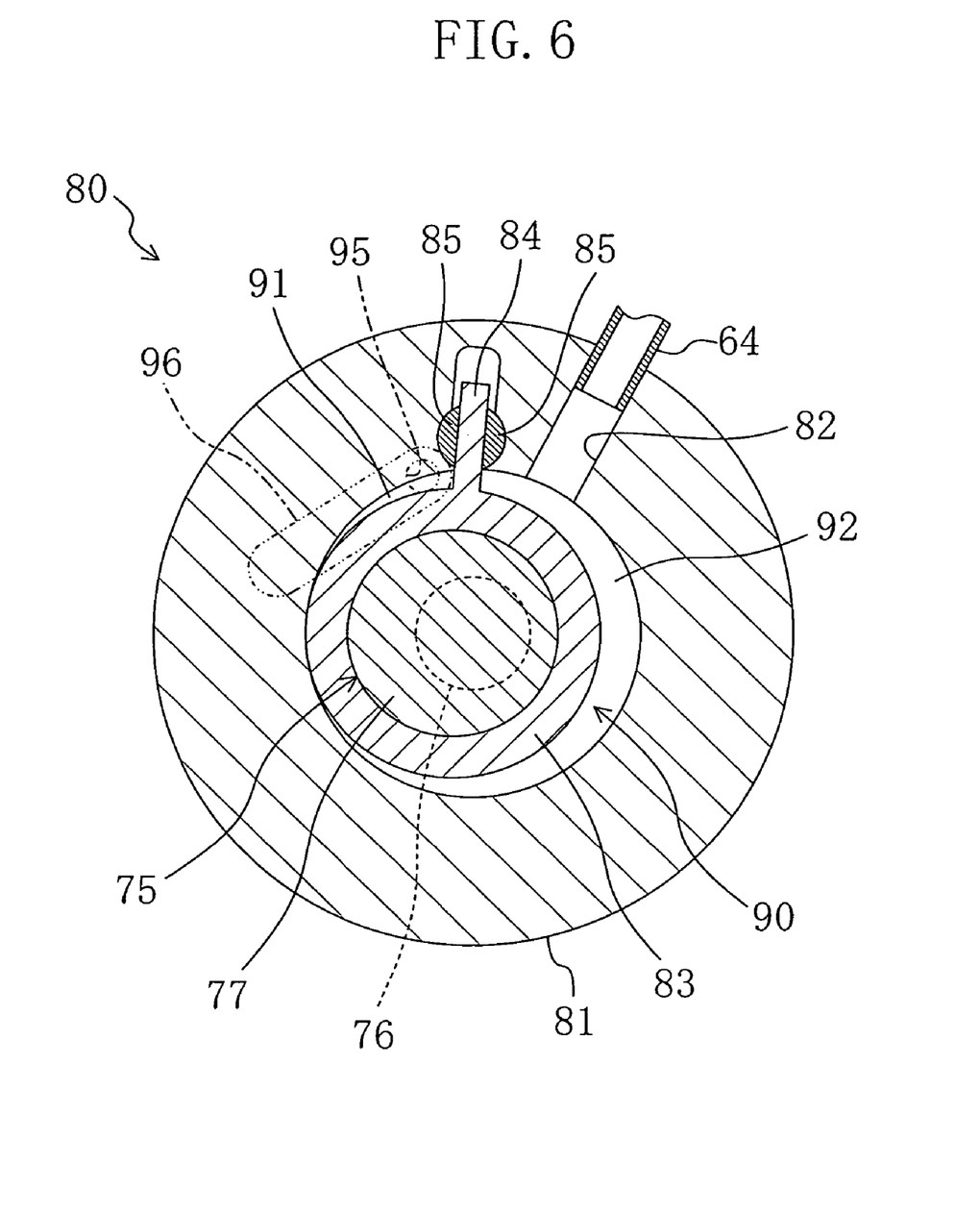
FIG. 6 is a cross sectional view showing a major section of the rotary compressor of the second embodiment.

As shown in FIG. 6, the compression mechanism (80) has a cylinder (81), a front head (86), a rear head (88), and a piston (83). The front head (86) is positioned above the cylinder (81) while, on the other hand, the rear head (88) is positioned under the cylinder (81). The cylinder (81) is sandwiched by the front head (86) and the rear head (88) from above and below. The front head (86) and the rear head (88) constitute, respectively, side plates for closing both ends of the cylinder (81).

The cylinder (81) is formed into a thick, short tubular shape. On the other hand, the piston (83) is formed into a tubular shape having approximately the same height as that of the cylinder (81). The piston (83) engages the eccentric part (77) of the drive shaft (75) and its inner peripheral surface is in sliding contact with the outer peripheral surface of the eccentric part (77). In addition, the outer peripheral surface of the piston (83) is in sliding contact with the inner peripheral surface of the cylinder (81). A compression chamber (90) is formed in the inside of the cylinder (81) by accommodating the piston (83) in the cylinder (81).

A blade (84) is formed integrally with the piston (83). The blade (84) is shaped like a plate, and projects outwards from the outer peripheral surface of the piston (83). The compression chamber (90), sandwiched between the inner peripheral surface of the cylinder (81) and the outer peripheral surface of the piston (83), is divided by the blade (84) into a high-pressure side (91) and a low-pressure side (92). In FIG. 6, the low-pressure side (92) of the compression chamber (90) is situated on the right-hand side of the blade (84) and the high-pressure side (91) of the compression chamber (90) is situated on the left-hand side of the blade (84).

The cylinder (81) is provided with a pair of bushes (85). Each bush (85) is shaped like a half-moon. The pair of bushes (85) are disposed with the blade (84) sandwiched therebetween, and slide relative to the side surface of the blade (84). In addition, the bushes (85) are rotatable relative to the cylinder (81), with the blade (84) sandwiched therebetween.

A suction port (82) is formed in the cylinder (81). One end of the suction port (82) opens into the inner peripheral surface of the cylinder (81) and communicates with the low-pressure side (92) of the compression chamber (90). A suction pipe (64) is inserted into the other end of the suction port (82). The suction pipe (64) passes completely through the body of the casing (61), extending to outside the casing (61).

As shown in FIG. 5, the front head (86) is shaped like an approximately flat plate and its lower surface is in close contact with the upper surface of the cylinder (81). A main bearing part (87) shaped like a tube is formed centrally in the front head (86), such that it projects upwards. The main bearing part (87) constitutes a slide bearing for supporting the drive shaft (75).

A discharge port (95) in communication with the high-pressure side (91) of the compression chamber (90) is formed in the front head (86). In addition, a discharge valve (96) which is formed by a reed valve is disposed in the front head (86), such that it covers the discharge port (95) (see FIG. 6). A muffler (97) for reducing the pulsation of discharged gas is attached to the upper surface of the front head (86).

The rear head (88) is shaped like an approximately flat plate and its upper surface is in close contact with the lower surface of the cylinder (81). A sub bearing part (89) shaped like a tube is formed centrally in the rear head (88), such that it projects downwards. The sub bearing part (89) constitutes a slide bearing for supporting the drive shaft (75).

Figure 7:
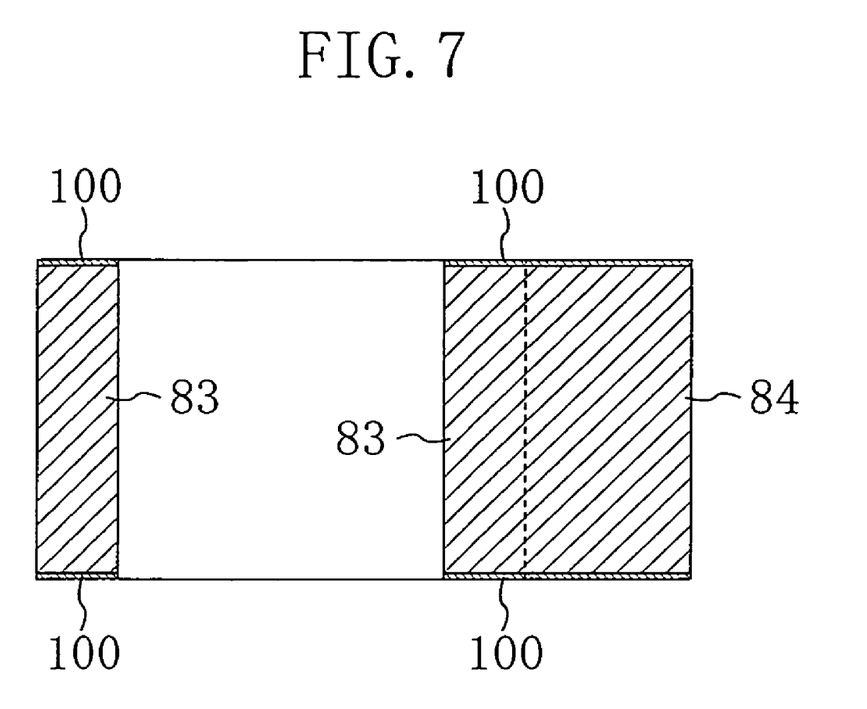
FIG. 7 shows in cross section a piston and a blade in the rotary compressor.

As shown in FIG. 7, the piston (83) and the blade (84) which are integrally formed are coated with the resinous coating (100). This resinous coating (100) is formed on both end surfaces of the piston (83) as well as on both end surfaces of the blade (84), i.e., upper and lower surfaces in FIG. 7. The resinous coating (100) formed on the upper end surface of the piston (83) and the resinous coating (100) formed on the upper end surface of the blade (84) are in sliding contact with the lower surface of the front head (86) while, on the other hand, the resinous coating (100) formed on the lower end surface of the piston (83) and the resinous coating (100) formed on the lower end surface of the blade (84) are in sliding contact with the upper surface of the rear head (88).

The resinous coating (100) provided in the rotary compressor (60) of the present embodiment is composed in the same way as the resinous coating (100) of the first embodiment. In other words, the primary component of the resinous coating (100) of the present embodiment is made up of fluorocarbon resin of not less than 15% by mass nor more than 35% by mass and polyamide-imide resin of not less than 65% by mass nor more than 85% by mass. In addition, the fluorocarbon resin in the primary ingredient comprises FEP (tetrafluoroethylene-hexafluoropropylene copolymer resin) and PTFE (polytetrafluoroethylene). The ratio of PTFE and FEP in the fluorocarbon resin is the same as that in the first embodiment.

Running Operation

The running operation of the rotary compressor (60) is described.

When a supply of electric power is provided to the electric motor (70) through the terminal (62), the drive shaft (75) is rotationally driven by the electric motor (70). When the drive shaft (75) rotates clockwise (relative to FIG. 6), the piston (83) which engages the eccentric part (77) of the drive shaft (75) moves with its outer peripheral surface in sliding contact with the inner peripheral surface of the cylinder (81). At that time, the piston (83) which is formed integrally with the blade (84) makes an eccentric motion, such that it oscillates while being in sliding contact with the cylinder (81). In addition, the end surface of the piston (83) and the end surface of the blade (84) are in sliding contact with the front head (86) or the rear head (88).

When the piston (83) travels within the cylinder (81), the volume of the low-pressure side (92) gradually increases, and gas refrigerant is drawn into the low-pressure side (92) of the compression chamber (90) through the suction port (82). At the same time, the volume of the high-pressure side (91) of the compression chamber (90) gradually decreases, and gas refrigerant confined within the high-pressure side (91) of the compression chamber (90) is compressed. When the internal pressure of the high-pressure side (91) of the compression chamber (90) gradually increases, the discharge valve (96) is pushed upwards by the gas refrigerant in time, and the compressed gas refrigerant is discharged, through the discharge port (95), to the inside of the muffler (97) (see FIG. 5). Thereafter, the compressed gas refrigerant passes through the discharge pipe (63) and then is discharged outside the casing (61).

Effects of Embodiment 2

In the present embodiment, the resinous coating (100) of the same composition as the first embodiment is provided in the rotary compressor (60). Consequently, the present embodiment makes it possible to provide the resinous coating (100) which is free from cracking and peeling-off over a long period of time and which is sufficiently low not only in the amount of abrasion but also in the coefficient of friction, thereby ensuring that the reliability of the rotary compressor (60) is improved without fail.

In addition, in the present embodiment, the resinous coating (100) is formed on the end surfaces of each of the piston (83) and the blade (84) which are integrally formed. In the commonly-used rotary compressor (60) of the swinging type, certain gaps are taken between the end surface of the piston (83) and the blade (84) and the front head (86) or the rear head (88) for the purpose of preventing the occurrence of seizure. As the result of this, an inflow of gas refrigerant into the cylinder (81) leaks from the gaps, e.g., one defined between the front head (86) (the rear head (88)) and the piston (83). This arises the problem of efficiency lowering.

On the other hand, in the present embodiment, the resinous coating (100) is applied onto the end surfaces of each of the piston (83) and the blade (84). As a result of such application, even when there is taken little clearance between the piston (83) and the blade (84), and the front head (86) or the rear head (88), it is possible to avoid seizure between the piston (83) and the blade (84), and the front head (86) or the rear head (88) by the resinous coating (100). Accordingly, the present embodiment makes it possible to improve the reliability of the rotary compressor (60) by preventing the occurrence of seizure between the piston (83) and the blade (84), and the front head (86) or the rear head (88) while, simultaneously, improving the efficiency of the rotary compressor (60) by narrowing the clearance between the front head (86) and the rear head (88), and the piston (83) and the blade (84).

Modified Example of Embodiment 2

In the rotary compressor (60) of the present embodiment, the resinous coating (100) is formed on the end surfaces of each of the piston (83) and the blade (84). Alternatively, the resinous coating (100) may be formed on areas of the lower surface of the front head (86) and the upper surface of the rear head (88) which slide relative to the piston (83) or the blade (84). Furthermore, it may be arranged that, in addition to the end surfaces (slide surfaces) of the piston (83) and the blade (84), the resinous coating (100) is formed on the slide surfaces of the front and rear heads (86) and (88).

In addition, in the rotary compressor (60) of the present embodiment, it may be arranged that the resinous coating (100) is formed either on the slide surfaces of the blade (84) and the bush (85) or on the slide surfaces of the bush (85) and the cylinder (81). Owing to the formation of the resinous coating (100) on these slide surfaces, the slide resistance between the blade (84) and the bushes (85) or the slide resistance between the bushes (85) and the cylinder (81) is reduced. Consequently, mechanical losses are reduced, thereby improving the efficiency of the rotary compressor (60). In addition, even in the case where the rotary compressor (60) falls into the state in which there is no refrigeration oil on these slide surfaces, depending on the operation conditions, lubrication between the bush (85), and the blade (84) and the cylinder (81) is provided by the resinous coating (100), thereby making it possible to improve the reliability of the rotary compressor (60).

In addition, the rotary compressor (60) of the present embodiment is not necessarily a compressor of the swinging type in which the blade (84) is formed integrally with the piston (83). For example, the rotary compressor (60) may be of the rolling piston type in which the blade (84) is formed as a separate member from the piston (83).

Other Embodiments

In each of the above-described embodiments, the present invention is applied to compressors which are a type of fluid machinery. However, the object of application of the present invention is not limited to compressors. For example, the present invention is applicable to expansion machines.

INDUSTRIAL APPLICABILITY

As has been described above, the present invention is useful for fluid machinery such as compressors and expansion machines.

What is claimed is:

1. A fluid machine comprising:
    a plurality of component members having a plurality of slide surfaces; and
    a resinous coating formed on at least one of said slide surfaces,
    said resinous coating being composed primarily of a fluorocarbon resin and a polyamide-imide resin, the fluorocarbon resin including polytetrafluoroethylene and tetrafluoroethylene-hexafluoropropylene copolymer resin, and
    a component percentage of said polyamide-imide resin in the primary component of said resinous coating being not less than 65% by mass nor more than 85% by mass.

2. The fluid machine as set forth in claim 1, further comprising
    a stationary scroll and a movable scroll including at least one of said component members in which a stationary-side wrap of said stationary scroll and a movable-side wrap of said movable scroll are engaged with each other,
    a supporting member including at least one of said component members for supporting a thrust load from said movable scroll, and
    said resinous coating is formed on a slide surface of said movable scroll and/or a slide surface of said supporting member.

3. The fluid machine as set forth in claim 2, wherein
    said movable-side wrap is formed at said movable scroll in a standing manner on a front surface of a flat plate part,
    said supporting member slides relative to a back surface of said flat plate part of said movable scroll, and
    said resinous coating is formed on said slide surface of said supporting member relative to said movable scroll.

4. The fluid machine as set forth in claim 3, wherein
    said supporting member includes a thrust ring that is formed by a ring shaped metal plate.

5. The fluid machine as set forth in claim 1 further comprising
    a cylinder including at least one of said component members, a plurality of side plates including at least one of said component members for closing both ends of said cylinder, and a tubular piston including at least one of said component members configured to move eccentrically within said cylinder, and
    said resinous coating is formed on either one or both of an end surface of said piston and a surface of said side plates which are in sliding contact with each other.

6. The fluid machine as set forth in claim 1, further comprising
    a stationary scroll and a movable scroll including at least one of said component members in which a stationary-side wrap of said stationary scroll and a movable-side wrap of said movable scroll are engaged with each other,
    a supporting member including at least one of said component members for supporting a thrust load from said movable scroll, and
    said resinous coating is formed on a slide surface of said movable scroll and/or a slide surface of said supporting member.

7. The fluid machine as set forth in claim 6, wherein
    said movable-side wrap is formed at said movable scroll in a standing manner on a front surface of a flat plate part,
    said supporting member slides relative to a back surface of said flat plate part of said movable scroll, and
    said resinous coating is formed on said slide surface of said supporting member relative to said movable scroll.

8. The fluid machine as set forth in claim 7, wherein
    said supporting member includes a thrust ring that is formed by a ring shaped metal plate.

9. The fluid machine as set forth in claim 1, further comprising
    a cylinder including at least one of said component members, a plurality of side plates including at least one of said component members for closing both ends of said cylinder, and a tubular piston including at least one of said component members configured to move eccentrically within said cylinder, and
    said resinous coating is formed on either one or both of an end surface of said piston and a surface of said side plates which are in sliding contact with each other.

10. The fluid machine as set forth in claim 1, wherein
    a mass ratio of said tetrafluoroethylene-hexafluoropropylene copolymer resin is larger than a mass ratio of said polytetrafluoroethylene in said coating.

* * * * *